United States Patent [19]
Kishi et al.

[11] Patent Number: 5,278,767
[45] Date of Patent: * Jan. 11, 1994

[54] METHOD OF CREATING CURVED SURFACES

[75] Inventors: Hajimu Kishi, Hino; Masaki Seki, Suginami, both of Japan

[73] Assignee: Fanuc Ltd, Minamitsuru, Japan

[*] Notice: The portion of the term of this patent subsequent to May 13, 2003 has been disclaimed.

[21] Appl. No.: 819,020

[22] Filed: Jan. 15, 1986

Related U.S. Application Data

[63] Continuation of Ser. No. 451,162, Dec. 7, 1982, Pat. No. 4,589,062.

[30] Foreign Application Priority Data

Apr. 10, 1981 [JP] Japan .................................. 56-054044

[51] Int. Cl.$^5$ ............................................. G05B 19/415
[52] U.S. Cl. ................................. 364/474.29; 318/570; 364/474.25
[58] Field of Search ........... 364/168, 169, 474, 167.01, 364/474.29, 474.25; 318/570, 573

[56] References Cited

U.S. PATENT DOCUMENTS

| | | | |
|---|---|---|---|
| 2,927,258 | 3/1960 | Lippel | 364/474.01 |
| 3,548,173 | 12/1970 | Pascoe et al. | 364/474.31 |
| 3,882,304 | 5/1975 | Walters | 364/169 |
| 4,589,062 | 5/1986 | Kishi et al. | 364/168 |

OTHER PUBLICATIONS

Dictionary of Computers, Information Processing, and Telecommunications; by Jerry M. Rosenberg; 1984, 1987; John Wiley and Sons; pp. xiii, xiv, 424.

*Primary Examiner*—Allen MacDonald
*Attorney, Agent, or Firm*—Staas & Halsey

[57] ABSTRACT

A curved surface generation method well-suited for application to the preparation of a numerical control tape used in the numerically controlled machining of a three-dimensional body such as a three-dimensional mold. The surface creation method includes steps of defining, on a first section curve or reference curve of a three-dimensional curved body, a point Pi (i=1,2 ...) which corresponds to a point Qi (i=1,2 ...) on a second section curve or reference curve, and generating an intermediate section curve in accordance with the established correspondence. A curved surface is created by collecting a plurality of the intermediate section curves together. Accordingly, the invention raises the degree of freedom with which a curved surface is created, and enables the accurate creation of a curved surface featuring subtle changes, allowing the precise machining of a three-dimensional body.

14 Claims, 14 Drawing Sheets

Fig. 1(a)
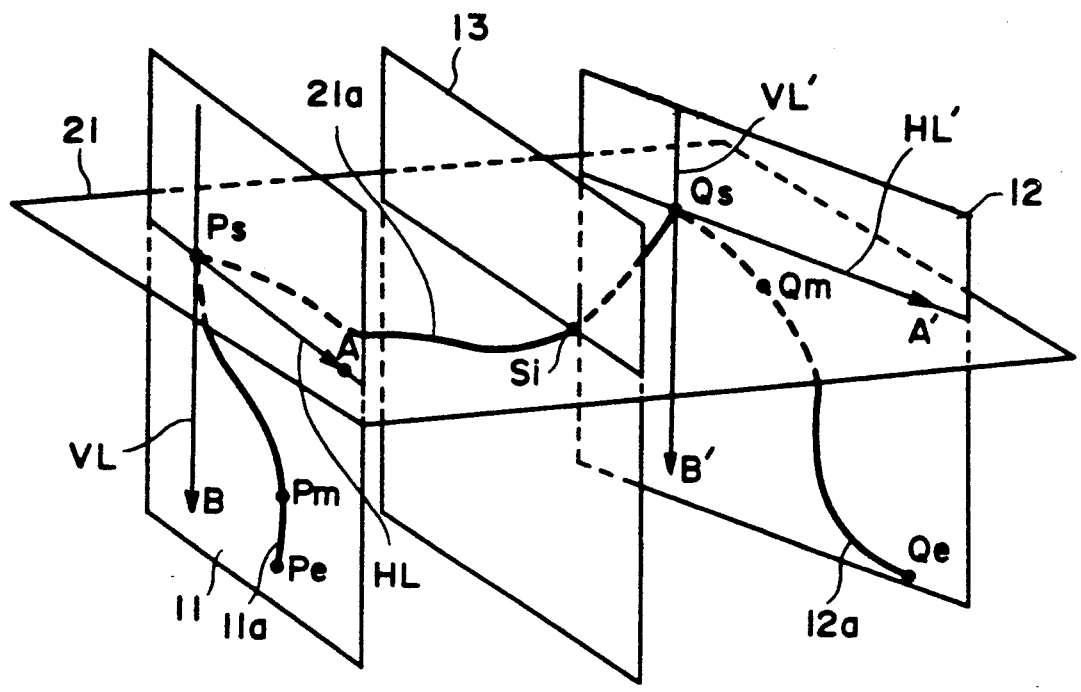
Fig. 1(b)
Fig. 1(c)
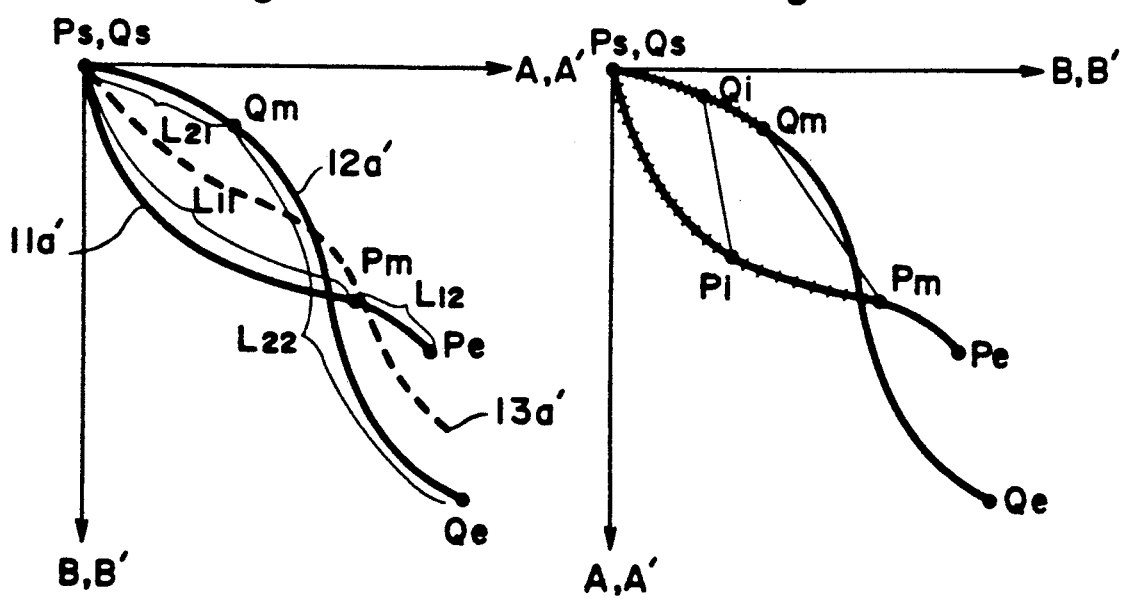

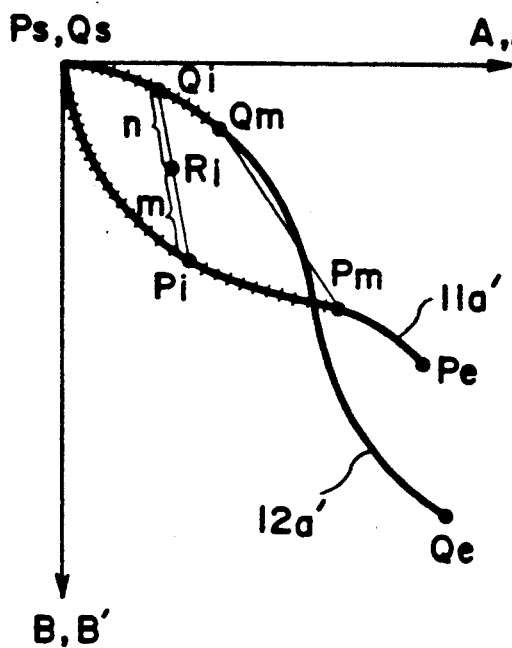
Fig. I(d)
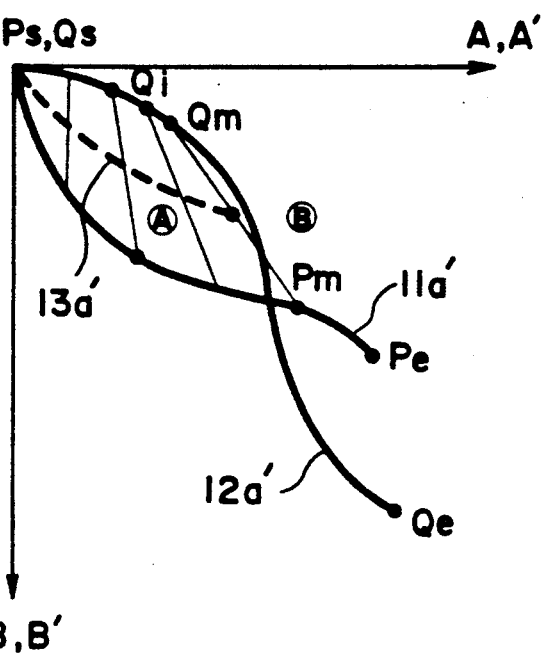
Fig. I(e)
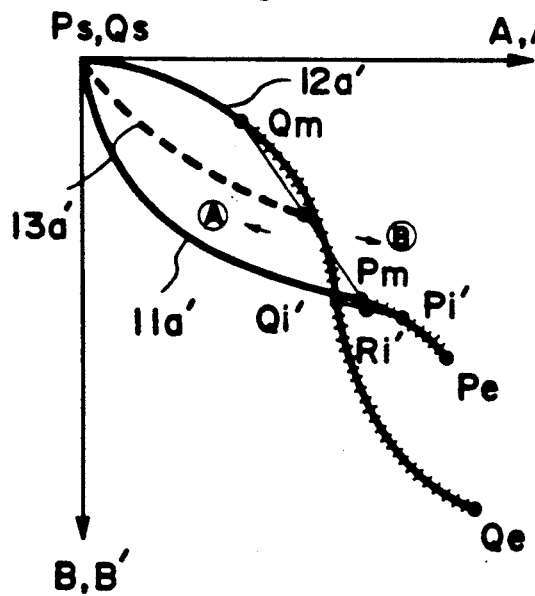
Fig. I(f)
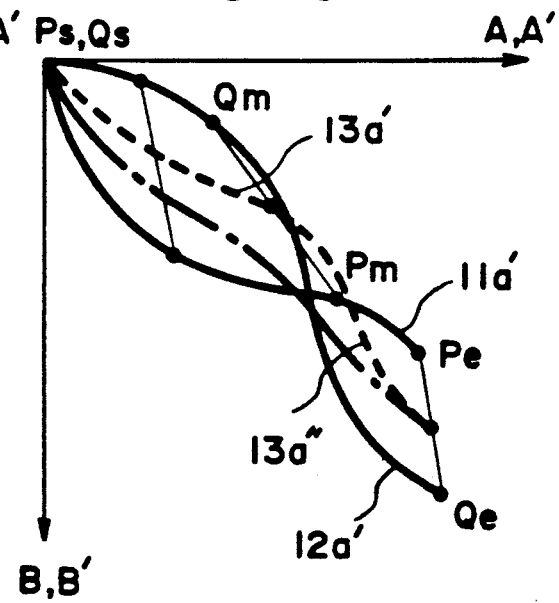
Fig. I(g)

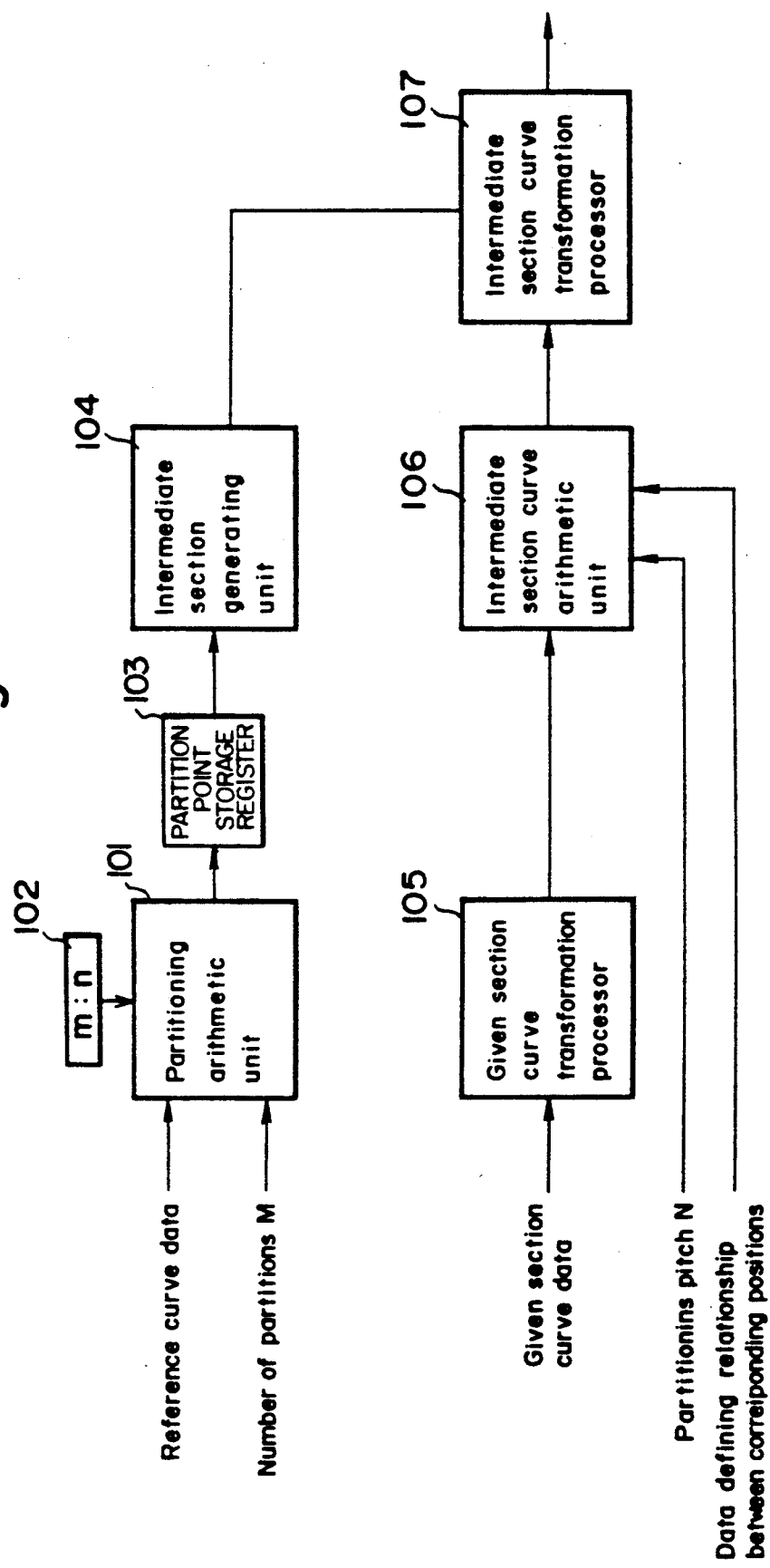

METHOD OF CREATING CURVED SURFACES

CROSS-REFERENCE TO RELATED APPLICATION

This application is a continuation of Ser. No. 451,162, filed Dec. 7, 1982, now U.S. Pat. No. 4,589,062.

BACKGROUND OF THE INVENTION

This invention relates to a method of creating the curved surface of a three-dimensional body and, more particularly, to a method of creating curved surfaces that, is ideal for the preparation of a numerical control (NC) tape required for the numerically controlled machining of a three-dimensional metal mold or the like.

A curved surface of a three-dimensional metal mold or the like, when drawn out on the plane of a blueprint, is generally represented by a plurality of given section curves, but no data is shown for the shape of the area lying between a certain section curve and the next adjacent section curve. When carrying out numerically controlled machining it is essential that these two section curves be connected smoothly despite the fact that the shape of the area between them is not given. In other words, this means that machining must be performed by generating the curved surface between the two section curves from such data as that indicative of the section curves, punching an NC tape so as to incorporate the data concerning the generated curved surface, and then machining the workpiece in accordance with the instructions on the NC tape. To this end, the numerical control tape ordinarily is prepared by using a computer, and either of two methods can be adopted to create the curved surface, namely (1) a patch system in which processing is executed by partitioning a curved surface into minute portions, and (2) a system in which a two-dimensional curve made of straight line segments and arcs is modified for each pick-feed applied to a third axis.

The patch system (1), however, entails the processing of large quantities of data as well as highly complicated mathematical processing, and requires a large-scale computer system. The system (2) makes processing with a small-scale computer possible, but there is no three-dimensional tool offset capability and there is an excessive limitation upon tool movement direction and machining shape, making it impossible to create sophisticated three-dimensional bodies.

Accordingly, the inventors have already proposed a method of creating curved surfaces, comprising generating a plurality a intermediate sections and finding a section curve (intermediate section curve) on a curved body, based on the intermediate sections, in accordance with predetermined rules, from section data specifying given sections of a three-dimensional curved body and from data specifying section curves in said sections, and generating the curved surface of the three-dimensional body based on the plurality of generated intermediate section curves. In other words, with the previously proposed method, one of two given section curves is shifted, while being transformed, so as to be superposed on the second section curve, at which time the curved surface formed by shifting the first section curve is generated as a collection of a plurality of intermediate section curves. In generating the intermediate section curves, uniform correspondence is established between the first and second section curves in their entirety. More specifically, when each section curve is partitioned into M segments, correspondence is established between i-th (i=1,2, ... n) partitioning points Pi, Qi on the respective curves. Each of the intermediate section curves is generated using this corresponding relationship.

When a single, unique corresponding relationship between section curves is decided in this manner, however, freedom in creating a curved surface is lost so that there are cases where a curved surface featuring subtle changes cannot be created with accuracy. For example, in a case where one section curve is composed of a curve segment A having little curvature and a gentle curve segment B that is much longer than the curve segment A, the curved surface near the curve segment A cannot be expressed accurately with the above-described method. In addition, the foregoing curved surface generation method is not suitable when it is desired to obtain a curved surface which is slightly different from a curved surface created based on the uniform corresponding relationship.

SUMMARY OF THE INVENTION

Accordingly, an object of the present invention is to provide a curved surface generation method that is capable of enhancing the freedom with which a curved surface is created and that enables the accurate creation of a curved surface having subtle changes.

When creating the curved surface of a three-dimensional metal mold or the like, namely a three-dimensional curved body, the invention includes steps of defining, on a first section curve or reference curve of a three-dimensional curved body, a point Pi (i=1,2 ... ) which corresponds to a point Qi (i=1,2 ... ) on a second section curve or reference curve, and generating an intermediate section curve in accordance with the established correspondence. A curved surface is created by collecting a plurality of the intermediate section curves together. Accordingly, even in a case where, say, one section curve is composed of a curve segment A having little curvature and a gentle curve segment B that is much longer than the curve segment A, with the present invention the curved surface near the curve segment A can be expressed in an accurate manner. It is also possible to obtain a curved surface which is slightly different from a curved surface generated in accordance with a uniform corresponding relationship. In other words, the invention raises the degree of freedom with which a curved surface may be generated and enables the creation of a curved surface that features subtle changes.

BRIEF DESCRIPTION OF THE DRAWINGS

FIG. 1(a) is an explanatory diagrams describing the present invention for a case where two section curves and one reference curve are given;

FIG. 1(b) is a diagram of two given section curves and an intermediate section curve transformed into a common plane;

FIG. 1(c) is a diagram of two given section curves in a common plane illustrating a partitioning process according to the present invention;

FIGS. 1(d)-1(f) are diagrams illustrating steps of forming an intermediate section in the common plane according to the present invention;

FIG. 1(g) is a diagram of intermediate section curves generated according to the present invention and according to a previously proposed method of the inventors;

FIG. 8 is a block diagram of the present invention;

DESCRIPTION OF THE PREFERRED EMBODIMENTS

Figure 1H:
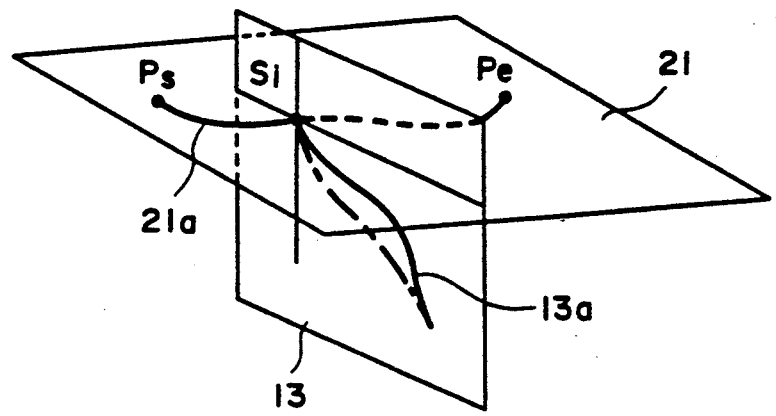
FIG. 1(h) is a diagram illustrating the intermediate section curves of FIG. 1(g) after transformation onto a corresponding intermediate section plane.

FIG. 1 is an explanatory view for describing the curved surface creation method of the present invention in a case where two section curves and one reference curve are given.

In the FIG. 1, reference numerals 11, 12 denote two sections (given sections) of a three-dimensional curved body, and 11a, 12a denote section curves (given section curves) for a case where the three-dimensional curved surface is cut by the given sections 11, 12. Numeral 21 denotes a reference plane containing points Ps, Qs on the respective section curves 11a, 12a. Numeral 21a denotes a reference curve lying in the reference plane 21 and specifying the external form of the three-dimensional curved body. Numeral 13 denotes an intermediate section. The intermediate section 13 is generated so as to contain a partition point Si which divides the length of the reference curve 21a into a ratio of m:n, and so as to lie perpendicular to the reference plane 21 and reference curve 21a.

The steps for creating a surface will now be described.

(1) The first step is to enter data (block 134 in FIG. 9) specifying the given sections 11, 12, the given section curves 11a, 12a, the reference plane 21 and the reference curve 21a, data concerning the corresponding positional relationship between the given section curves 11a, 12a, partitioning information for partitioning the reference curve, and the pitch at which the section curves are partitioned. The number of partitions or the partitioning pitch, etc., are entered as reference and section curve partition data.

(2) Next, the coordinates of the partition point Si for partitioning the reference curve 21a into the ratio m:n are found (block 138 in FIG. 9) on the basis of the partitioning information entered in step (1). For example, if the number of partitions is M, the coordinates of the partition point Si for partitioning the reference curve 21a into the ratio m:n are found through the following steps 2-1)–2-4). It is assumed that M=m+n.

The length of each element constituting the reference curve 21a is found (where the term "element" is taken to mean a line segment or an arc forming a portion of the reference curve 21a), and these lenghs are added together to find the total length D of the reference curve.

2-2) D' is evaluated from $$\frac{m}{(m+n)} \cdot D = D'$$

Figure 10:
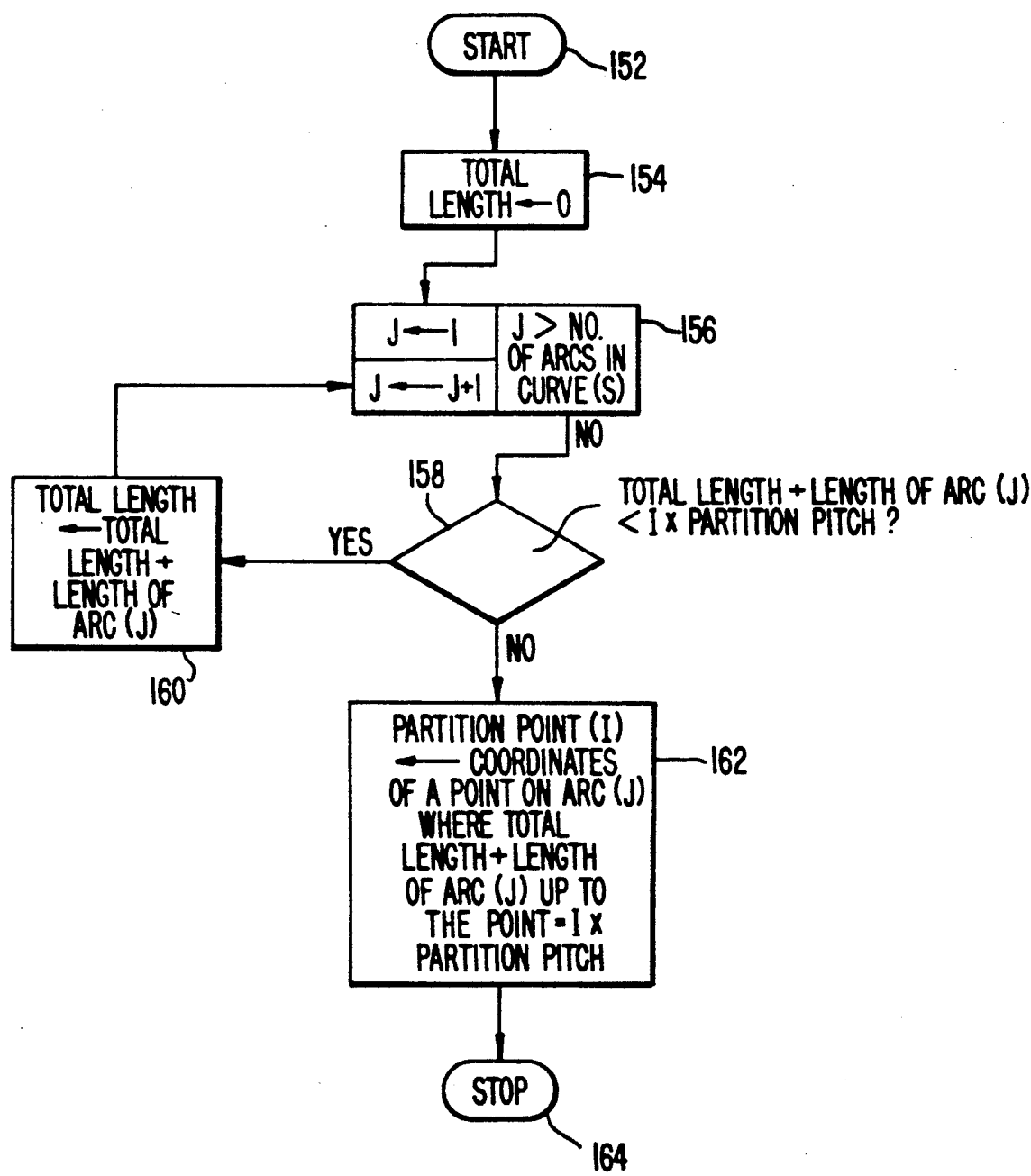
FIG. 10 is a flow chart of a partitioning process according to the present invention.

2-3) An element is extracted containing a point at a distance D' from one end, which point serves as a partition point for partitioning (see FIG. 10). If $D_1$ is taken as the length of the initial element, $D_2$ as the length of the next element, $D_i$ as the length of the i-th element and so on, the extraction of elements is carried out by finding the k that satisfies the following inequality (block 158 in FIG. 10):

$$\sum_{i=1}^{k-1} D_i \leq D' \leq \sum_{i=1}^{k} D_i$$

2-4) This step (block 162 in FIG. 10) is to find the point on the k-th element whose distance from the starting point thereof is D'', where D'' is found from:

$$D'' = D' - \sum_{i=1}^{k-1} D_i$$

The point obtained is that which partitions the given curve into the ratio m:n from one end thereof. It will be assumed that, in 2-3), $$\sum_{i=1}^{k-1}$$

$D_i = 0$ when $k=1$. Accordingly, if $M=m+n$, $m=i+1$ and i is varied in the manner i=0, 1, 2, ... (M−1), then we can find the coordinates of each partition point Si for dividing the reference curve equally into M segments.

(3) The given section curves 11a, 12a are transformed so as to lie on the same plane [FIG. 1(b)]. It should be noted that the given section curves 11a, 12a can be considered to be curves on a common plane by performing (see FIG. 11) the following operations 3-1) through 3-3):

3-1) The points of intersection Ps, Qs of the reference curve 21a and both given sections 11, 12 are taken as same point.

3-2) Considering lines of intersection HL, HL' of the reference plane 21 and the given sections 11, 12, these lines of intersection HL1, HL2 are divided by the respective points of intersection Ps, Qs. Of these divided segments, those that have the same direction with respect to the reference curve 21a are superposed (block 174 in FIG. 11).

3-3) Considering that straight lines VL, VL', which pass through the points of intersection Ps, Qs of the reference curve 21a and the given sections 11, 12 and which at the same time are perpendicular to the reference plane 21 which lying on the given planes 11, 12, it is seen that the lines of intersection VL, VL' are divided by the points of intersection Ps, Qs, respectively. Of these divided segments, those that have the same direction with respect to the reference plane 21 are superposed (block 176 in FIG. 11)

Figure 12:
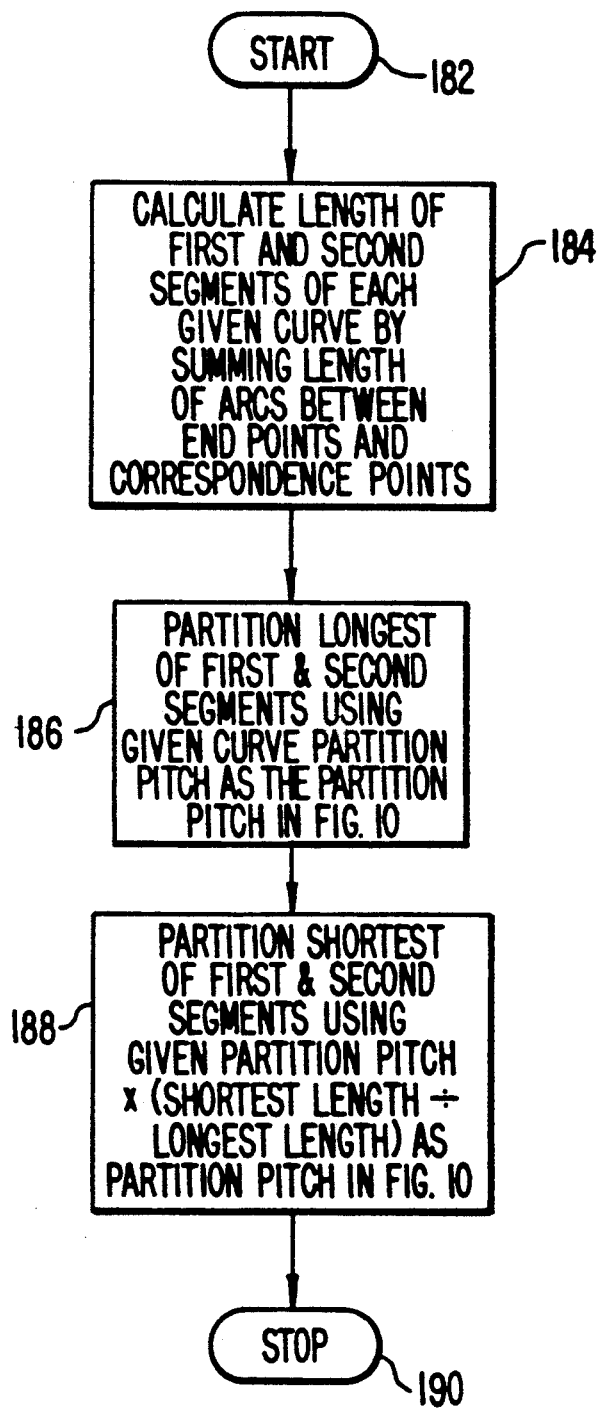
FIG. 12 is a flow chart of a method for partitioning two given section curves or two reference curves according to the present invention.

(4) By using the two given section curves 11a', 12a' lying in the predetermined plane obtained from step (3) above, an intermediate section curve 13a' is generated in said plane (see FIG. 12).

The intermediate section curve 13a is generated through the procedure described below. We shall assume that the section curve partitioning pitch is given by N (mm).

4-1) With regard to the given section curves 11a', 12a', we obtain the length L11 of the PsPm segment, the length L12 of the PmPe segment, the length L21 of the QsQm segment, and the length L22 of the QmQe segment [FIG. 1(b) and block 184 of FIG. 12].

4-2) The operations M11=L11/N, M12=L12/N, M21=L21/N, M22=L22/N are performed, and M11, M21 are compared in magnitude, as are M12, M22. The larger numerical value in the first pair is taken as the number of partitions of the segments PsPm and QsQm, and the larger numerical value in the second pair is taken as the number of partitions of the segments PmPe and QmQe. We shall assume that the inequalities M11>M21, M12<M22 hold. Also, M11, M12, M21, M22 are integers, obtained after raising decimals to the next higher whole number.

4-3) The PsPm and QsQm segments of the respective given section curves 11a', 12a' are each partitioned into M11 segments (block 186 and 187 in FIG. 12). Partitioning processing is performed by executing 2-2) to 2-3) in step (2), whereby partition points Pi, Qi (i=1,2,3 ... ) are obtained [FIG. 1(c)].

Figure 13:
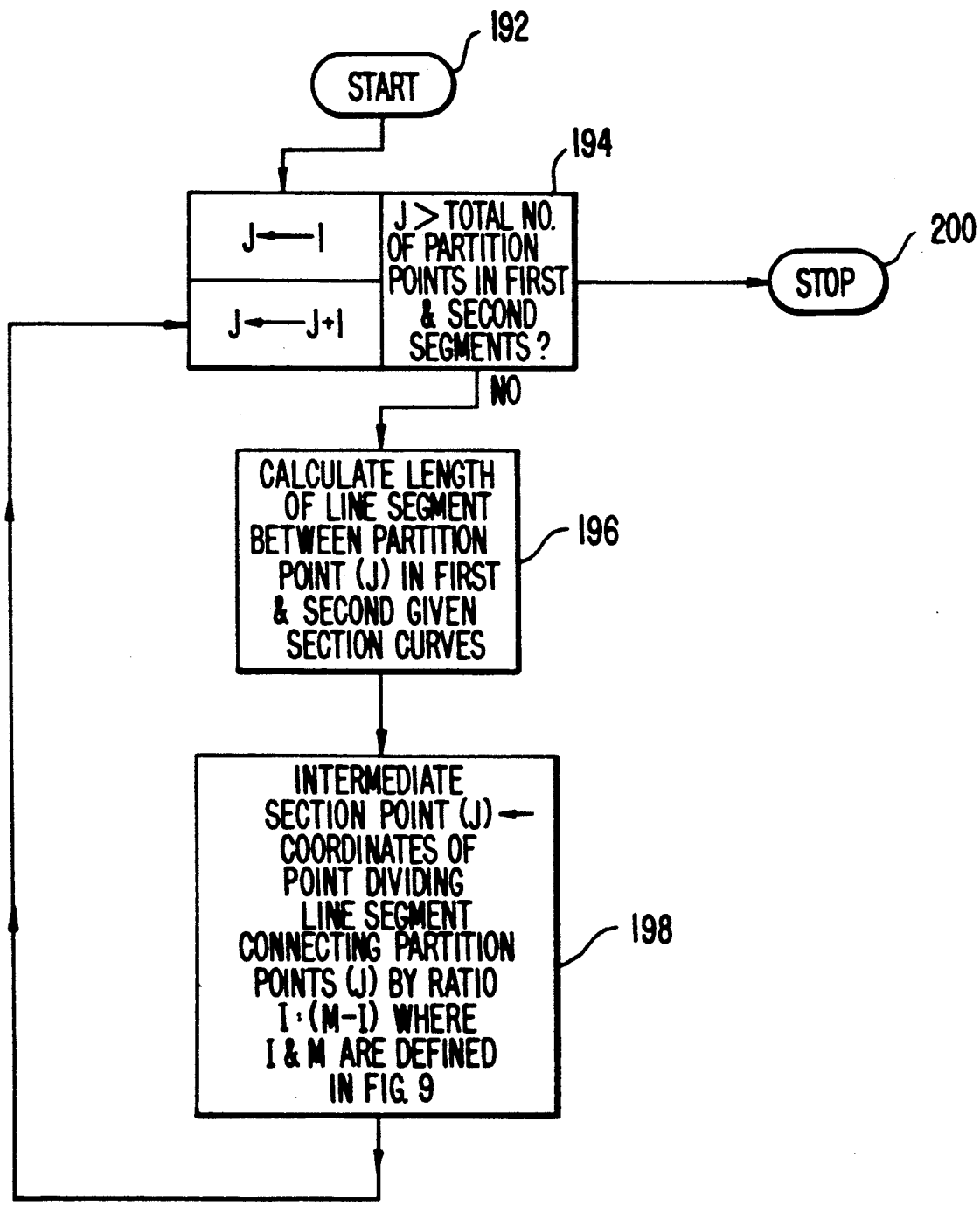
FIG. 13 is a flow chart of a method for generating an intermediate section curve from two given section curves and a reference curve according to the present invention.

4-4) A division point $R_i$ is computed, which point partitions a straight line, connecting the partition points Pi, Qi, with a length ratio equal to the partitioning ratio m:n of step (2). [See FIG. 1(d) and blocks 196 and 198 in FIG. 13]

If we let the coordinates of the partitioning points Pi, Qi be $(x_1,y_1)$ and $(x_2,y_2)$, respectively, then the coordinates $R_i(X,Y)$ of the division point $R_i$ may be calculated from:

$$X = x_1 + \frac{m}{m+n}(x_2 - x_1)$$

$$Y = y_1 + \frac{1m}{m+n}(y_2 - y_1)$$

4-5) Thereafter, i is incremented [i=1,2, ... (M11−1)] so that the intermediate section curve 13a' is generated in region Ⓐ by a series of resulting division points Ri (i=1,2, ... ) [FIG. 1(e) and block 194 in FIG. 13].

4-6) The PmPe and QmQe segments of the respective given section curves 11a', 12a' are partitioned into M22 segments. Partitioning processing is performed by executing 2-2) to 2-3) in step (2), whereby partition points P'i, Q'i ' (i=1,2,3 ... ) are obtained [FIG. 1(f)].

4-7) The steps 4-4), 4-5) are executed to generate an intermediate section curve 13a'' in region Ⓑ by a series of points Ri' (i=1,2 ... ) [FIG. 1(g)].

Figure 9:
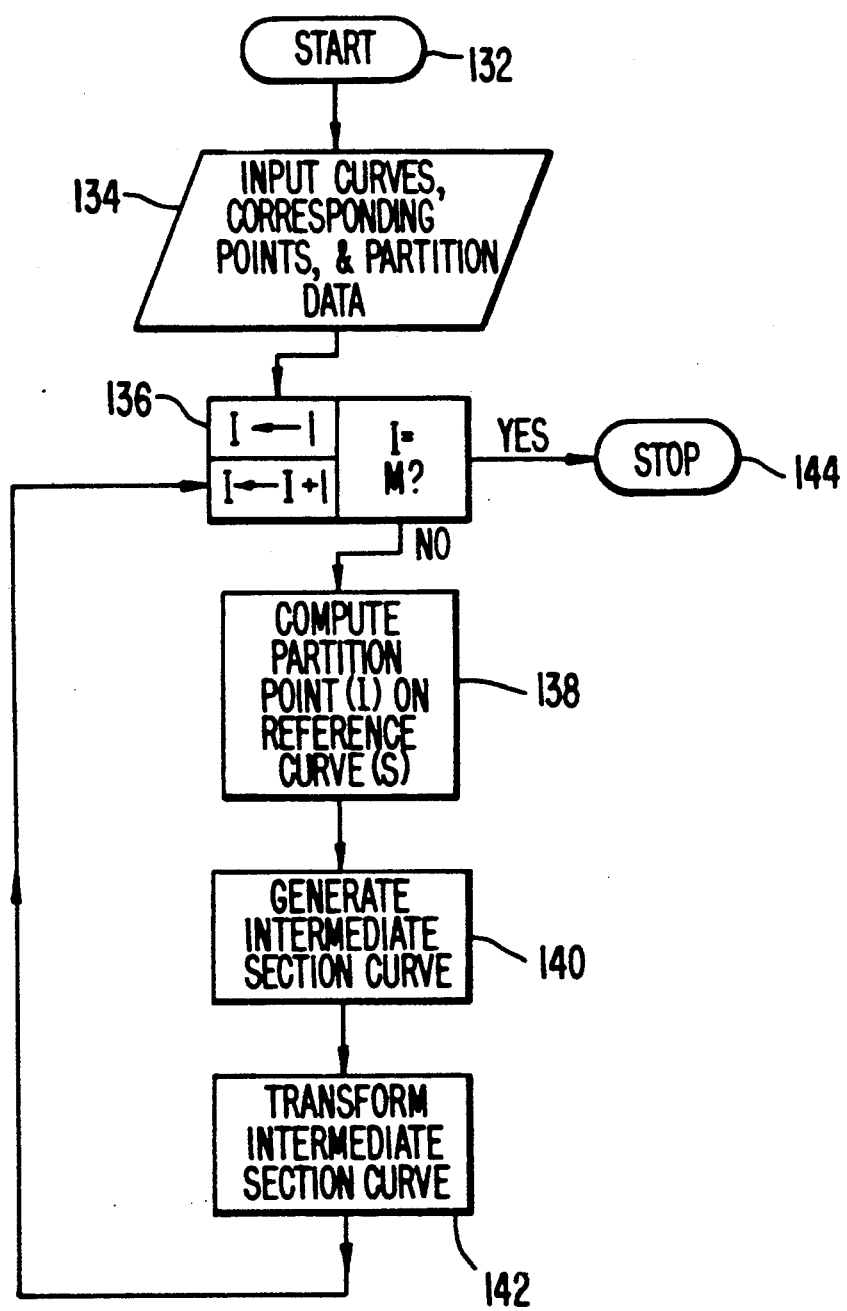
FIG. 9 is a flow chart of the basic steps of a method according to the present invention.

(5) The intermediate section curves 13a', 13a'' on the predetermined plane found in step (4) are transformed into a curve in the defined intermediate section plane 13 [FIG. 1(a) and block 142 of FIG. 9]. It should be noted that the transformation into the intermediate section 13 of the predetermined common plane obtained in step (3) can be expressed by a combination of a parallel and rotational translation in space. The formula for the transformation generally is expressed by a matrix M. By performing a matrix transformation M for the points Ri, Ri' (i=1,2, ... ) found in step (4), the points Ri, Ri' can be transformed into points in defined space. The curve obtained by connecting the series of points in defined space, found from the matrix transformation, becomes the intermediate section curve 13a in the intermediate section 13 [FIG. 1(h)].

Thereafter, if the operations m=i+1, n=M-n are performed to find the coordinates of the next partition point Si+1 of the reference curve and steps (2) through (5) are repeated, a curved surface will be created by assembling the resulting multiplicity of intermediate section curves.

The dot-and-dash line shown in FIG. 1(g) and in FIG. 1(h) illustrates the intermediate section curve which results when uniform correspondence is established between the given section curves 11a, 12a in their entirety. In the foregoing, the shape of the curved surface can be modified by defining, in advance, a first correspondence point Pm on the first section curve which corresponds to a second correspondence point Qm on the second section curve. Furthermore, a curved surface which changes in a subtle manner can be created by modifying the positional relationship of the corresponding points.

In the foregoing, a case was described where the corresponding points were end points Ps, Qs, intermediate correspondence points Pm, Qm, one on each curve, and end points Pe, Qe. It is permissible, however, to provide two or more sets of intermediate correspondence points. It was also described that two given section curves 11a, 12a and one reference curve 21 are given. The present invention can also be applied in cases where (a) only two given section curves are given, (b) one given section curve and two reference curves are given, and (c) two given section curves and two reference curves are given.

Figure 2B:
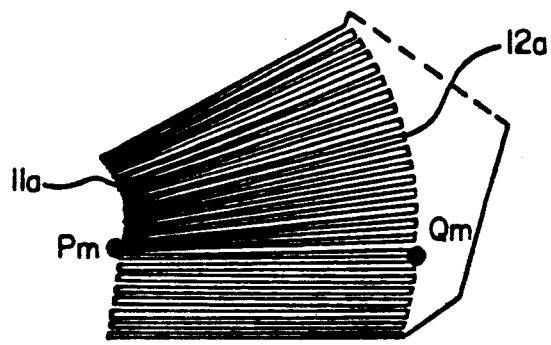
FIG. 2(b) is a perspective diagram of a curved surface generated by a method according to the present invention.
Figure 2A:
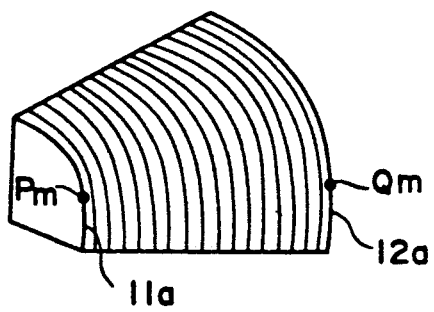
FIG. 2(a) is a perspective diagram of a curved surface defined by two given section curves and a reference curve.
Figure 2C:
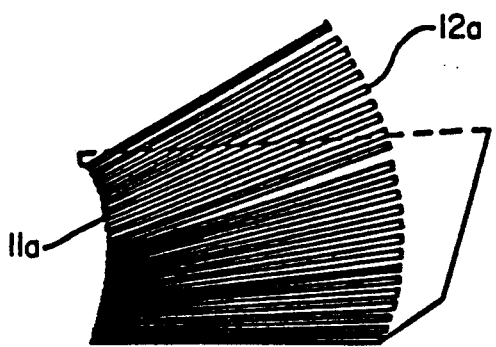
FIG. 2(c) is a perspective diagram of a curved surface generated according to a prior method proposed by the inventors.

FIG. 2 (a) illustrates the case where only two given section curves 11a, 12a are given, FIG. 2(b) a curved surface created by applying the present invention, and FIG. 2(c) a curved surface created according to the previously proposed method. It should be noted that Pm, Qm are the correspondence points on the given section curves 11a, 12a, respectively.

Figure 3A:
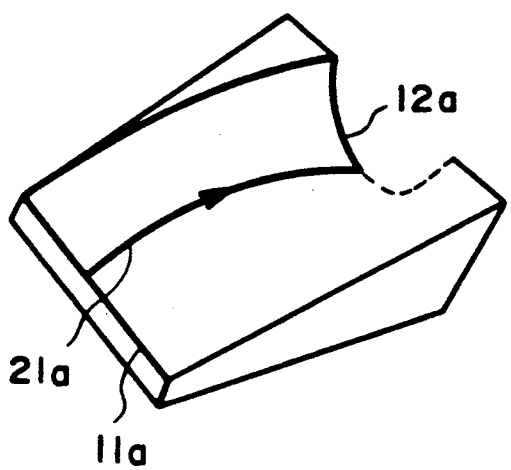
FIG. 3(a) is a perspective diagram of a curved surface defined by two given section curves and a reference curve.
Figure 3B:
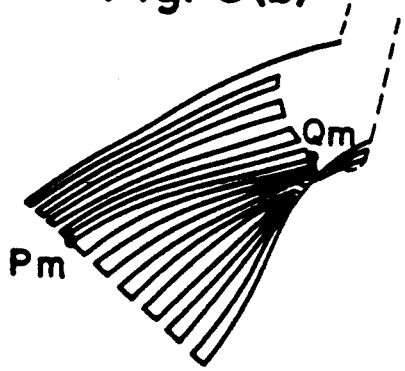
FIG. 3(b) is a perspective diagram of a curved surface generated by a method according to the present invention.
Figure 4B:
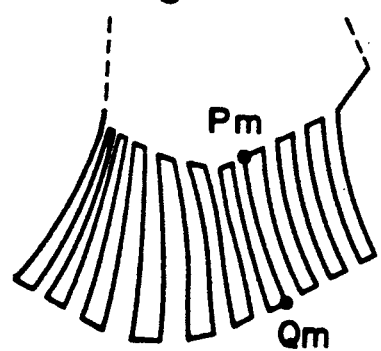
FIG. 4(b) is a perspective diagram of a curved surface generated by a method according to the present invention.
Figure 3C:
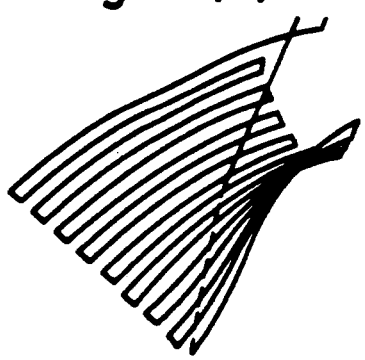
FIG. 3(c) is a perspective diagram of a curved surface generated according to a prior method proposed by the inventors.
Figure 4C:
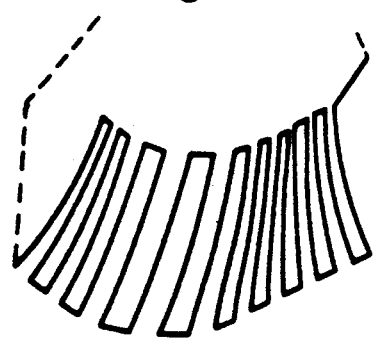
FIG. 4(c) is a perspective diagram of a curved surface generated according to a prior method proposed by the inventors.

FIG. 3 is an explanatory view for the case where two given section curves 11a, 12a and one reference curve 21a are given. The desired curved surface is described by the given section curve 11a when said section curve is moved along the reference curve 21a so as to coincide with the given section curve 12a. Taking Pm, Qm as the correspondence points, the generated surface will assume the shape shown in FIG. 3(b) by moving the given section curve 11a while it is being transformed to bring it into coincidence with the given section curve 12a, thus bringing the point Pm into coincidence with the point Qm. FIG. 3(c) shows the curved surface which would be created by the previously proposed method.

Figure 4A:
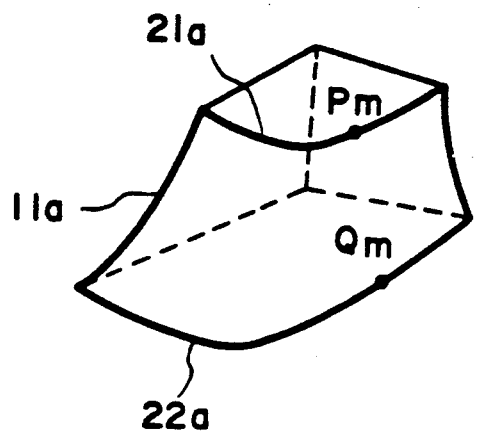
FIG. 4(a) is a perspective diagram of a solid defined by one section curve and two reference curves.

Reference will now be had to FIG. 5 to describe an embodiment of the present invention for a case where one given section curve and two reference curves are given, as depicted in FIG. 4(a).

In FIG. 5, reference numeral 11 denotes a section (given section) of a three-dimensional curved body, and 11a denotes a section curve (given section curve) for a case where the three-dimensional curved surface is cut by the given section 11. Numerals 21, 22 denote first and second reference planes containing respective points Ps, Qs on the given section curve 11a. Numerals 21a, 22a denote reference curves lying in the respective first and second reference planes 21, 22 and specifying the external form of the three-dimensional curved body. Numeral 13 denotes an intermediate section which contains point Pi internally dividing the PsPm segment of the first reference curve 21a into a ratio of m:n, point Qi internally dividing the QsQm segment of the second reference curve 22a into a ratio of m:n, as well as a point of intersection Pt between the first reference plane 21 and a perpendicular dropped on the reference plane 21 from the partition point Qi.

The procedure for creating a curved surface will be described with reference to FIG. 5.

(1') The first step is to enter the data (block 134 of FIG. 9) specifying the given section 11, the given section curve 11a, the reference planes 21, 22 and the reference curves 21a, 22a, data concerning the corresponding positional relationship between the given reference curves 21a, 22a, and the reference curve partition pitch N (mm) at which the reference curves are partitioned. The corresponding points are the end points Ps and Qs, the points Pm and Qm, and the correspondence end points Pe and Qe.

(2) Next, the positions of the partition points Pi,Qi for internally dividing the PsPm and QsQm segments of the reference curves 21a, 22a into the ratio m:n, respectively, are found (block 138 in FIG. 9) by using the reference curve partition pitch N (mm). It should be noted that the positions of the partition points Pi, Qi can be obtained by employing a procedure similar to the steps 4-1) to 4-3) described above in connection with FIG. 1.

Figure 5A:
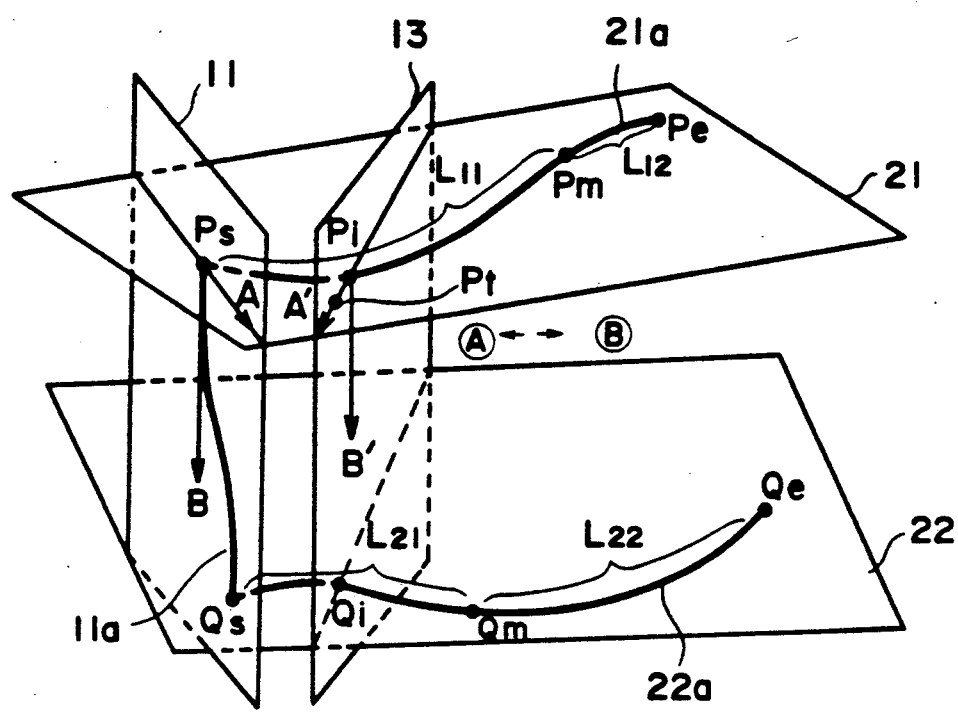
FIG. 5(a) is an explanatory diagram describing the present invention for a case where one section curve and two reference curves are given.

2-1') With regard to the reference curves 21a, 22a, we obtain the length L11 of the PsPm segment, the length L12 of the PmPe segment, the length L21 of the QsQm segment, and the length L22 of the QmQe segment [FIG. 5(a) and block 184 in FIG. 12].

2-2') The operations $M11=L11/N$, $M12=L12/N$, $M21=L21/N$, $M22=L22/N$ are performed, and M11, M21 are compared in magnitude, as are M12, M22. The larger numerical value in the first pair is taken as the number of partitions of the segments PsPm and QsQm in the region Ⓐ, and the larger numerical value in the second pair is taken as the number of partitions of the segments PmPe and QmQe in the region Ⓑ. We shall assume that the inequalities $M11>M21$, $M12<M22$ hold. Also, M11, M12, M21, M22 are integers, obtained after raising decimals to the next higher whole number.

2-3') The PsPm and QsQm segments of the respective reference curves 21a, 22a are each partitioned into M11 segments (block 186 and 188 in FIG. 12). Partitioning processing is performed by executing 2-2) to 2-3) in step (2) described above with reference to FIG. 1, whereby partition points Pi, Qi are obtained.

Figure 5B:
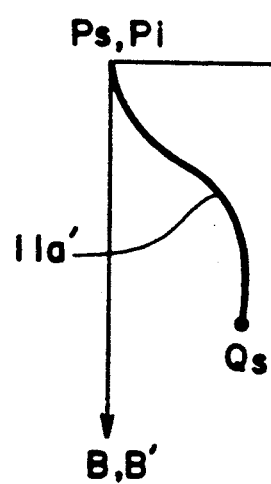
FIG. 5(b) is a diagram of a given section curve and corresponding partitioning points on two reference curves transformed into a common plane.
Figure 11:
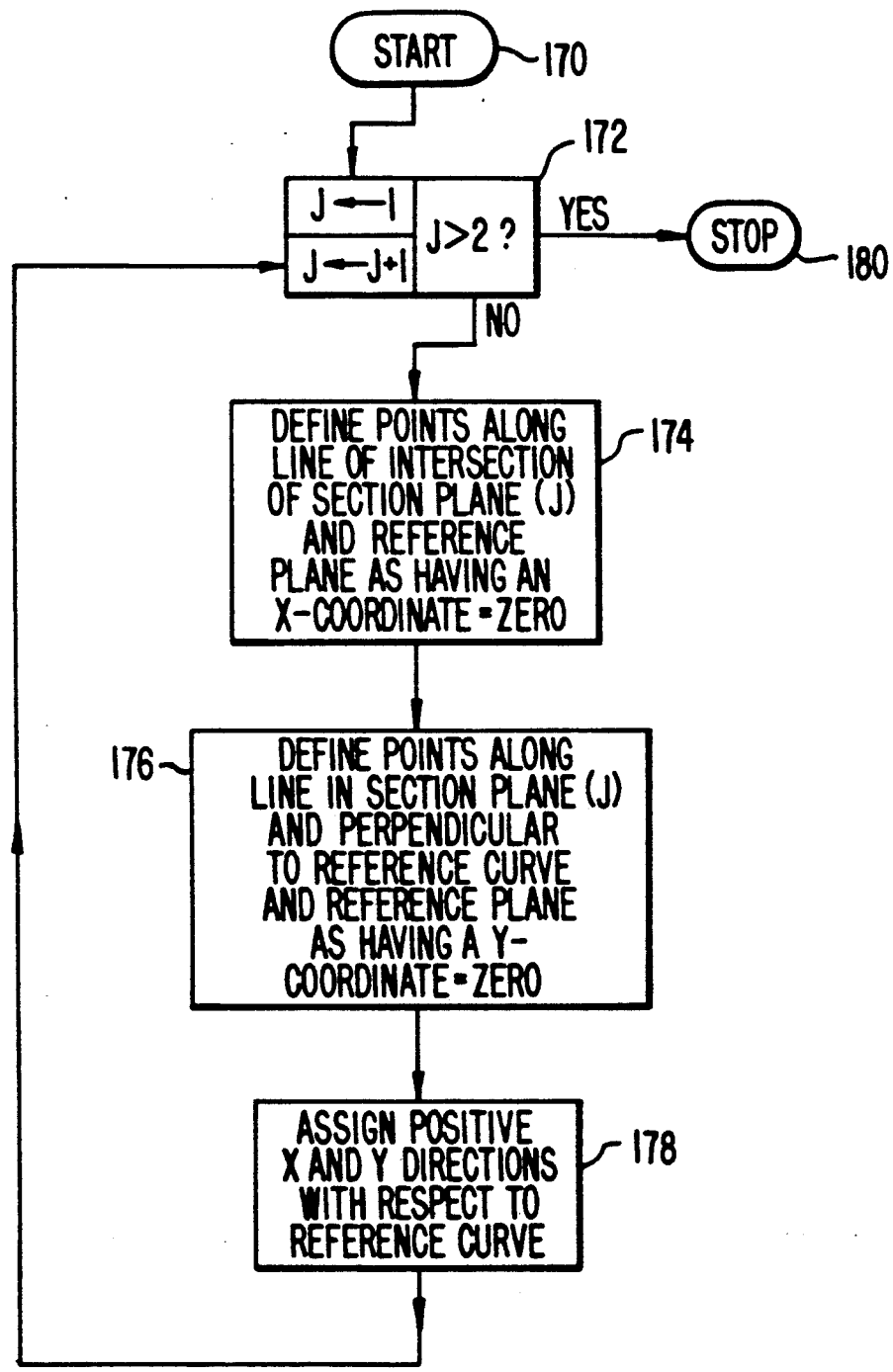
FIG. 11 is a flow chart of a method for transforming two section planes into a common plane according to the present invention.

(3') The given section curve 11a and points of intersection Pi, Qi (partition points for the ratio m:n) between the intermediate section 13 and the first and second reference curves 21a, 22a, are transformed into a curve and points on a common plane [FIG. 5(b) and FIG. 11]. The transformation into this common plane is performed through a procedure similar to that of step (3) described above.

Figure 14:
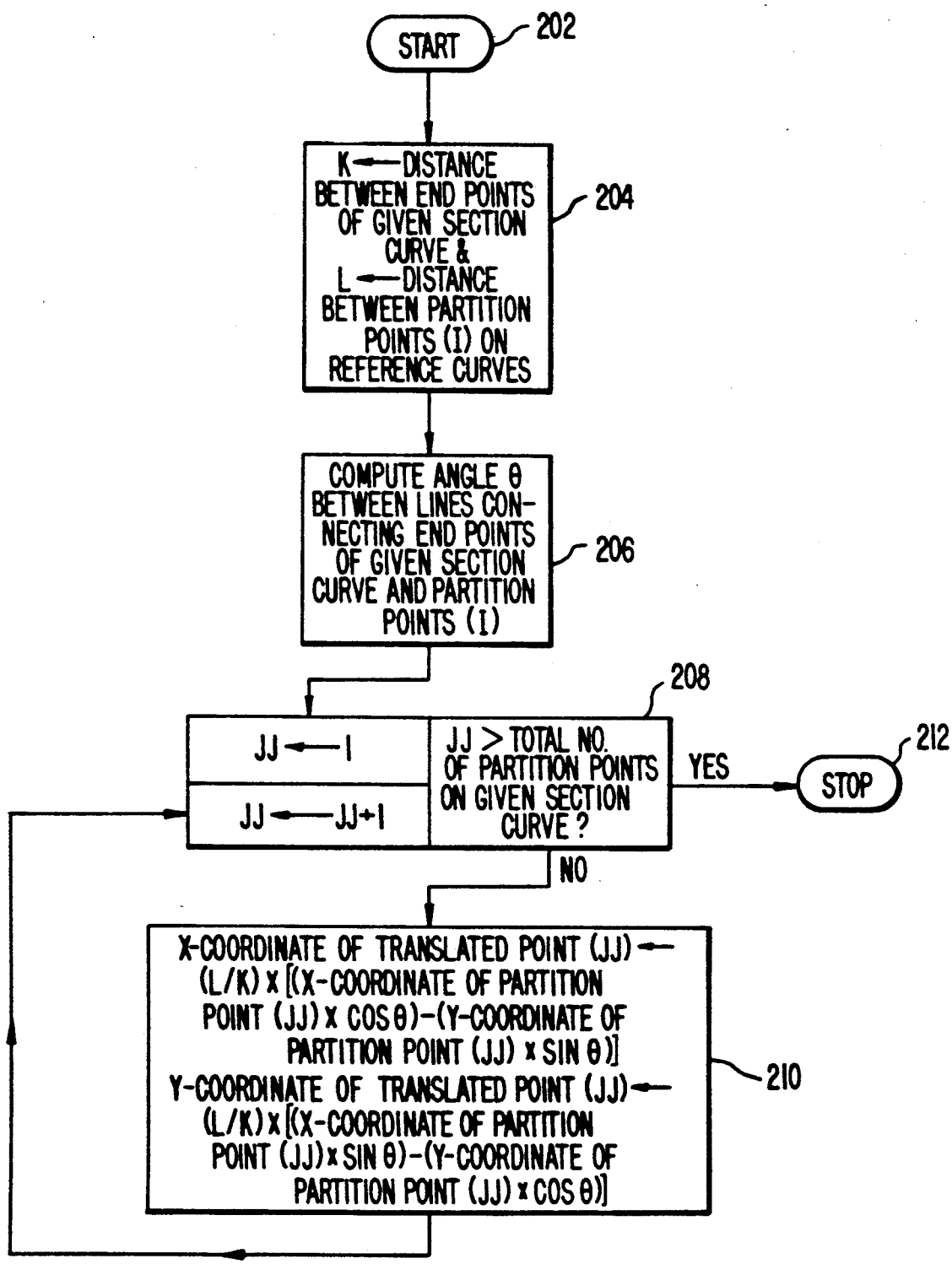
FIG. 14 is a flow chart of a method for generating an intermediate section curve from two reference curves and a given section curve according to the present invention.

(4') By using the points of intersection Pi, Qi, as well as the given section curve 11a' in the predetermined plane, found in step (3'), an intermediate section curve is generated in said plane (block 140 in FIG. 9). The intermediate section curve is generated through the following procedure:

4-1) A computation is performed to obtain the ratio k/l of the length of the line segment connecting the starting point Ps and end point Qs of the given section curve 11a' resulting from the transformation into the predetermined common plane, to the length of the line segment connecting the points of intersection Pi, Qi which have also been transformed into points in the predetermined plane (block 204 in FIG. 14). In addition, an angle $\theta$ is computed (block 206 in FIG. 14). The angle θ is the angle of rotation through which the line segment PsQs of the angle ∠QsPsQi is rotated in the counter-clockwise direction to bring it into coincidence with the line segment PiQi. The counter-clockwise direction is taken as the positive direction [FIG. 5(c)].

4-2) The partition point Si which partitions the given section curve 11a' into a ratio of a:b is computed according to the method of steps 2-1) through 2-3) [FIG. 5 (c)].

Figure 5C:
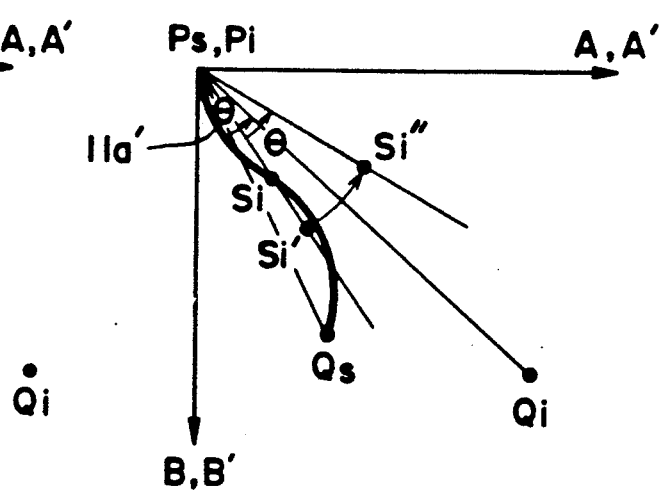
FIG. 5(c) is a diagram of the translation of a point Si on the given section curve into a point Si" on an intermediate section curve.

4-3) A computation is performed to find a translated point Si" which results when an a ratio point Si', located on the dividing the line, segment PsSi by the a ratio of K/1, is rotated through the angle θ [FIG. 5(c) and block 210 of FIG. 14].

Letting $(x_i, y_i)$ represent the coordinates of the partition point Si which divides the given section curve 11a' into a ratio of a:b, letting $(x_o, y_o)$ represent the coordinates of the point Ps, and letting $(X, Y)$ represent the coordinates of the translated point Si", the coordinates of the point Si" are found from:

$$X = x_o + \frac{K(x_i - x_o)}{k} \cdot \cos\theta - \frac{K(y_i - y_o)}{k} \cdot \sin\theta$$

$$Y = y_o + \frac{K(x_i - x_o)}{k} \cdot \sin\theta - \frac{K(y_i - y_o)}{k} \cdot \cos\theta$$

Figure 5D:
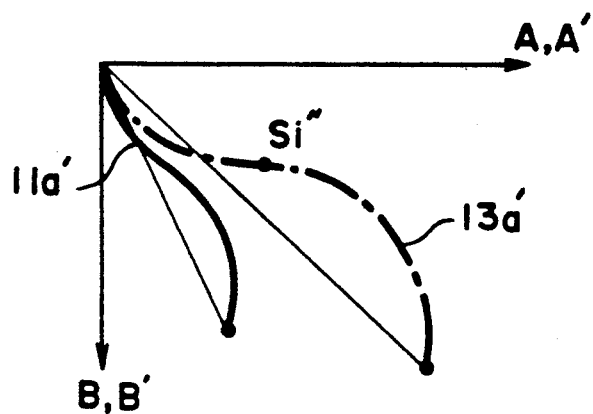
FIG. 5(d) is a diagram of the given section curve and an intermediate section curve in the common plane.

4-4) The intermediate section curve 13a' is generated by a series of translated points Si" (i=1,2,3 ...) obtained by successively changing the value of the partitioning ratio a/b of step 4-2) from 0 to 1 [FIG. 5(d) and block 208 of FIG. 14]. A smoother intermediate section curve 13a' can be obtained by making the successive changes in the value of a/b very small.

Figure 5E:
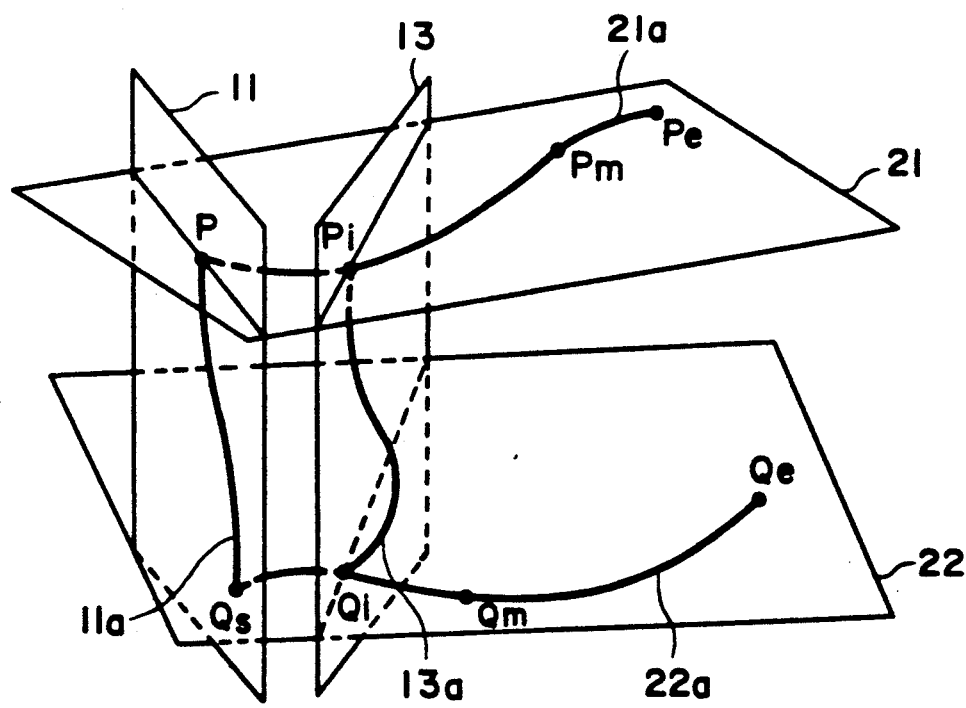
FIG. 5(e) is a diagram illustrating the intermediate section curve of FIG. 5(d) transformed into three-dimensional space defined by the given section curve and the reference curves.

(5') The intermediate section curve 13a' on the predetermined plane obtained in step (4') is transformed (block 142 in FIG. 9) into a curve lying on the intermediate section 13 [FIG. 5(a)] in defined space, whereby the intermediate section curve 13a shown in FIG. 5(e) is obtained.

(6') Thereafter, if the operations m=i+1, n=M11-m are performed (block 136 in FIG. 9) to find the coordinates of the next partition points of the reference curves 21a, 22a and steps (2)' through (5)' are repeated, a curved surface in the region Ⓐ (FIG. 5(a)) will be created by assembling the resulting multiplicity of intermediate section curves.

(7') Next, by carrying out the steps (1') through (6') for the PmPe and QmQe segments of the reference curves 21a, 22a, a surface will be generated in the region Ⓑ as an assemblage of a multiplicity of the intermediate section curves.

Figure 6A:
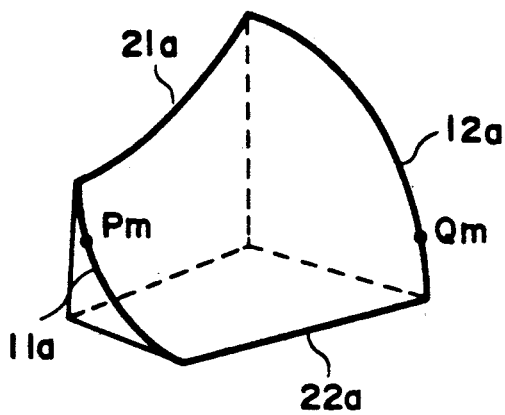
FIG. 6(a) is a perspective diagram of a solid defined by two section curves and two reference curves.
Figure 7A:
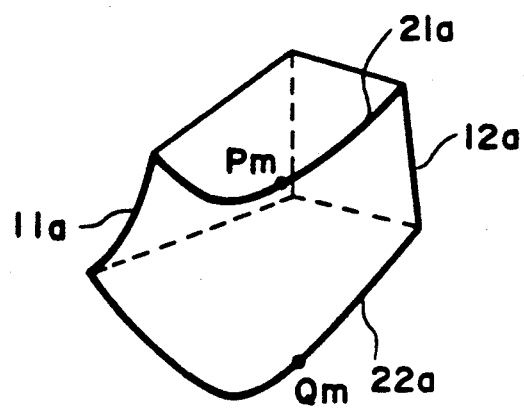
FIG. 7(a) is a perspective diagram of a solid defined by two section curves and two reference curves.
Figure 6B:
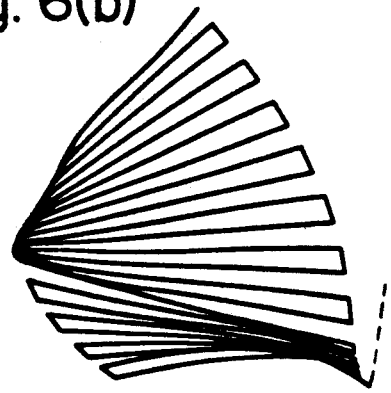
FIG. 6(b) is a perspective diagram of a curved surface generated by a method according to the present invention.
Figure 7B:
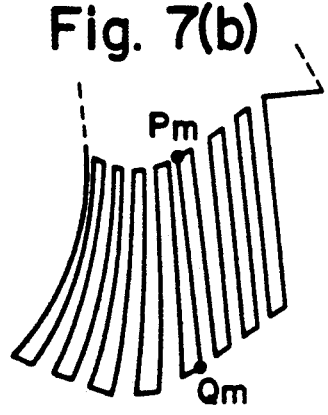
FIG. 7(b) is a perspective diagram of a curved surface generated by a method according to the present invention.
Figure 6C:
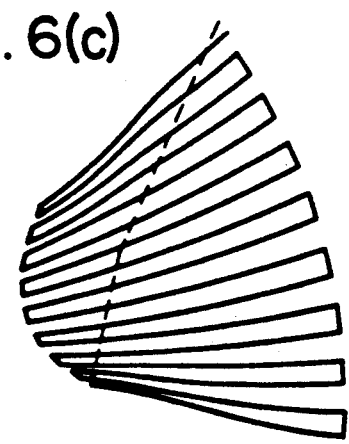
FIG. 6(c) is a perspective diagram of a curved surface generated according to a prior method proposed by the inventors.
Figure 7C:
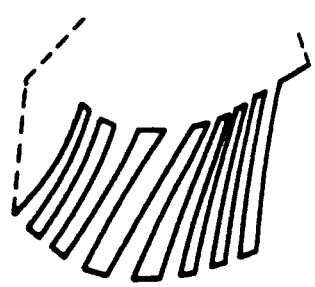
FIG. 7(c) is a perspective diagram of a curved surface generated according to a prior method proposed by the inventors.

FIGS. 6 and 7 are explanatory views for a case where two given section curves 11a, 12a and two reference curves 21a, 22a are given. FIG. 6 is for a case where the correspondence points Pm, Qm are taken on the given section curves, and FIG. 7 is for a case where they are taken on the reference curves. FIGS. 6(b) and 7(b) show examples of curved surfaces created by the present invention, and FIGS. 6(c) and 7(c) show examples of curved surfaces created by the previously proposed method.

FIG. 8 is a block diagram for realizing the curved surface creation method according to the present invention for a case where two given section curves and one reference curve are given. FIG. 8 will be described while referring to FIG. 1. In the figure, numeral 101 denotes a partitioning arithmetic unit for computing the coordinates of the partition point Si upon receiving as inputs the data specifying the reference curve, the number of partitions M and the partitioning ratio m:n. Numeral 102 denotes a partitioning ratio storage register. Since the operations:

$$i+1 \to m, M-m \to n$$

are performed to change the partitioning ratio m:n each time the series of steps (1) through (5) are completed, the content of the register, namely m:n, is updated accordingly. It should be noted that, initially, i=1. Numeral 103 denotes a partition point storage register and 104 an intermediate section generating unit for computing an intermediate section which contains the partition point Si and which is perpendicular to the reference plane 21 and reference curve 21a. Numeral 105 designates a given section curve transformation processor for developing two given section curves into a predetermined common plane and for effecting a transformation into the given section curve data. Numeral 106 denotes an intermediate section curve arithmetic unit, and 107 an intermediate section curve transformation processor. The intermediate section curve arithmetic unit 106 executes the processing for the above-described step (4) for generating the intermediate section curve 13a' [FIG. 1(g)] as a collection of a multiplicity of the points Ri (i=1, 2, ...) and Ri' (i=1, 2, ...). The intermediate section curve transformation processor 107, through a matrix transformation, develops the intermediate section curve 13a' into the intermediate section 13 generated by the intermediate section generating unit 104. The output of the intermediate section curve transformation processor 106 is intermediate section curve data that is stored successively in a memory device, not shown. A three-dimensional curved body is created by collecting a plurality of the intermediate section curves together. It should be noted that while the arrangement of FIG. 8 is shown as being composed of units having a single function, the arrangement can be realized by a computer configuration.

According to the present invention as described above, the shape of a curved surface can be modified by defining correspondence points Pi, Qi on two curves. In addition, a curved surface featuring subtle changes can be created by altering the positional relationship between the correspondence points. In other words, according to the invention, the freedom with which a curved surface may be created is enhanced by introducing data defining the positional relationship of corresponding positions on the curves.

In the numerically controlled machining of a three-dimensional metal mold or the like, the present invention as set forth hereinabove raises the degree of freedom with which the curved surface of a three-dimensional body, such as a three-dimensional mold, is created, and enables the accurate creation of a curved surface featuring subtle changes. The invention therefore enables a three-dimensional curved body to be machined quickly and accurately and, hence, possesses great industrial utility.

What is claimed is:

1. A computerized method for forming a curved surface on a workpiece under the control of the numerical control commands created by moving and transforming a first section curve of two given section curves until the first section curve is superposed on a second section curve, said method comprising the steps of:
- (a) defining, on the first section curve, first correspondence points which correspond to second correspondence points on the second section curve;
- (b) generating intermediate section curves in accordance with the first and second correspondence points; and
- (c) creating numerical control commands for forming the curved surface on the workpiece as an assemblage of the intermediate section curves.

2. A computerized method for forming a curved surface on a workpiece under the control of the numerical control commands created by moving a single given section curve, while being transformed, along first and second given reference curves, said method comprising the steps of:
- (a) defining, on the first given reference curve, a first correspondence point which corresponds to a second correspondence point on the second given reference curve, the first and second correspondence points dividing the first and second given reference curves, respectively, into corresponding segments;
- (b) partitioning equally the corresponding segments, of the first and second reference curves to form corresponding partition points in each of the corresponding segments;
- (c) generating a plurality of intermediate section curves containing the corresponding partition points; and
- (d) creating numerical control commands for forming the curved surface on the workpiece as an assemblage of the plurality of intermediate section curves.

3. A method as recited in claim 2, wherein step (d) comprises the step of punching a numerical control tape to record commands for machining the workpiece along the intermediate section curves.

4. A method for producing a computer generated curved surface on a workpiece, comprising the steps of:
- (a) inputting curve data defining a reference curve and first and second given section curves and reference curve partition data defining first and second corresponding points on the first and second given section curves, respectively;
- (b) converting the curve data defining the first and second given section curves into partition data by using the section curve partition data to generate corresponding partition points on the first and second given section curves;
- (c) converting the reference curve partition data and partition points into intermediate section curve data representing intermediate section curves along the reference curve by applying the reference curve partition data to differences between the corresponding partition points; and
- (d) transforming the intermediate section curve data into numerical control commands for controlling numerically controlled machining forming the curved surface of the workpiece.

5. A method as recited in claim 4,
wherein step (a) comprises defining first and second segments on each of the first and second given section curves by the first and second correspondence points, respectively, and
wherein the length of the first segment divided by the length of the second segment in the first given section curve is unequal to the length of the first segment divided by the second segment in the second given section curve.

6. A method as recited in claim 5,
wherein the section curve partition data includes a section curve partition pitch,
wherein step (b) comprises the steps of:
- (bi) transforming the first and second given section curves to lie on a common plane;
- (bii) selecting the first segment of one of the first and second given section curves and the second segment of one of the first and second given section curves as selected first and second segments;
- (biii) partitioning the selected first and second segments using the section curve partition pitch to form first and second numbers of selected partitions, respectively; and
- (biv) partitioning the non-selected first and second segments to form first and second numbers of non-selected partitions, respectively, and wherein step (c) comprises generating each of the intermediate section curves by selecting a division point on a line connecting corresponding selected and non-selected partitions, the division point dividing the line into line segments having a length ratio defined by the reference curve partition data.

7. A method as recited in claim 4, wherein step (d) comprises the step of recording the numerical control data on a non-electrically maintained storage medium.

8. A method as recited in claim 7, wherein step (d) comprises the step of punching a paper tape.

9. A method for creating numerical control commands for producing a computer generated curved surface on a workpiece, comprising the steps of:
- (a) inputting curve data defining first and second reference curves having end points, a given section curve and first and second correspondence points on the first and second reference curves, respectively;
- (b) converting the curve data into segment curve data by segmenting each of the first and second reference curves into first and second segments defined by the first and second correspondence points and corresponding end points of each of the first and second reference curves, respectively;
- (c) converting the reference curve partition data and partition points into intermediate section curve data representing intermediate section curves along the first and second reference curves, the intermediate section curves partitioning the first and second segments with an equal length ratio; and
- (d) transforming the intermediate section curve data into numerical control commands for controlling numerically controlled machining forming the curved surface of the workpiece.

10. A method as recited in claim 9,
wherein the given section curve has first and second end points on the first and second reference curves, respectively, the first and second end points having a first line segment with a first length therebetween,
wherein step (a) further comprises establishing a reference curve partition pitch, and
wherein step (c) comprises the steps of:
- (ci) partitioning the first and second reference curves using the reference curve partition pitch to define an equal number of corresponding partition points on the first and second reference curves;

(cii) defining an intermediate section plane containing corresponding first and second partition points on the first and second reference curves, respectively, the first and second partition points having a second line segment with a second length therebetween;

(ciii) transforming the first and second partition points and the given section curve into a common plane by assigning the first end point and the first partition point identical coordinates and overlaying the intermediate section plane on a plane containing the given section curve;

(civ) computing a length ratio defined by the second length divided by the first length;

(cv) computing an angle between the first and second line segments in the common plane; and (cvi) translating the given section curve into one of the intermediate section curves by rotating in dependence upon the angle and modifying the length of the given section curve in dependence upon the length ratio.

11. A method as recited in claim 10, wherein said segmenting in step (b) forms third and fourth segments on the first and second reference curves, respectively, the first and third segments having only the first correspondence point in common and the second and fourth segments having only the second correspondence point in common, and wherein step (ci) comprises the steps of:

(ci1) comparing the first and second segments and the third and fourth segments to select first and second longest segments, respectively;

(ci2) partitioning the first and second segments to form a first number of the partition points on each of the first and second segments by applying the reference curve partition pitch to the first longest segment; and (ci3) partitioning the third and fourth segments to form a second number of the partition points on each of the third and fourth segments by applying the reference curve partition pitch to the second longest segment.

12. A method as recited in claim 10,
wherein step (a) further comprises inputting section curve partition data, and
wherein step (cvi) comprises the steps of:

(cvi1) selecting a section partition point on the given section curve;

(cvi2) computing a third length between the first end point and the section partition point;

(cvi3) computing a fourth length equal to the length ratio times the third length;

(cvi4) computing a translated point located at the distance equal to the fourth length from the first end point and lying on a first line rotated by an amount equal to the angle from a second line defined by the first end point and the section partition point; and (cvi5) repeating steps (cvi1) through (cvi4) for a number of times defined by the reference curve partition pitch.

13. A method as recited in claim 9, wherein step (d) comprises the step of recording the numerical control data on a non-electrically maintained storage medium.

14. A method as recited in claim 13, wherein step (d) comprises the step of punching a paper tape.

* * * * *